United States Patent
Corniglion et al.

(10) Patent No.: US 8,224,531 B2
(45) Date of Patent: Jul. 17, 2012

(54) METHOD FOR CONTROLLING THE AUTOMATIC START/STOP SYSTEM OF THE THERMAL ENGINE OF A VEHICLE, CORRESPONDING SYSTEM AND USE THEREOF

(75) Inventors: Cyrille Corniglion, Ermont (FR); Ertugrul Taspinar, Sucy-En-Brie (FR)

(73) Assignee: Valeo Equipements Electriques Moteur, Creteil (FR)

( * ) Notice: Subject to any disclaimer, the term of this patent is extended or adjusted under 35 U.S.C. 154(b) by 477 days.

(21) Appl. No.: 12/526,318

(22) PCT Filed: Feb. 1, 2008

(86) PCT No.: PCT/FR2008/050169
§ 371 (c)(1),
(2), (4) Date: Oct. 29, 2009

(87) PCT Pub. No.: WO2008/104671
PCT Pub. Date: Sep. 4, 2008

(65) Prior Publication Data
US 2010/0094512 A1    Apr. 15, 2010

(30) Foreign Application Priority Data
Feb. 7, 2007    (FR) ........................................ 0753111

(51) Int. Cl.
*G06F 19/00* (2006.01)

(52) U.S. Cl. ............................ 701/48; 701/112; 701/113
(58) Field of Classification Search ................... 701/36, 701/48, 51, 70, 78, 101, 112, 113
See application file for complete search history.

(56) References Cited

U.S. PATENT DOCUMENTS

| | | | |
|---|---|---|---|
| 7,979,120 B2 * | 7/2011 | Sherwood | 607/2 |
| 8,037,858 B2 * | 10/2011 | Seufert et al. | 123/179.25 |
| 8,086,391 B2 * | 12/2011 | Miah | 701/113 |
| 2002/0074173 A1 | 6/2002 | Morimoto et al. | |
| 2002/0086772 A1 | 7/2002 | Abe et al. | |

FOREIGN PATENT DOCUMENTS
WO    WO 2004/091961 A    10/2004
* cited by examiner

Primary Examiner — Richard M. Camby
(74) Attorney, Agent, or Firm — Berenato & White, LLC

(57) ABSTRACT

A method implemented in a vehicle, using information representative of an operational state of the vehicle being provided by sensors and a data communication bus. The information is representative of the engagement and disengagement of an exploitation assistance brake (EAB) and a speed of the vehicle and of a pressure on a brake pedal of the vehicle. A cut-off condition (C3) for the thermal engine can be validated when the speed is lower than a predetermined threshold and in the case where pressure is applied on the brake pedal or when the exploitation assistance brake is activated. The system includes at least one sensor for the condition of the exploitation assistance brake.

7 Claims, 1 Drawing Sheet

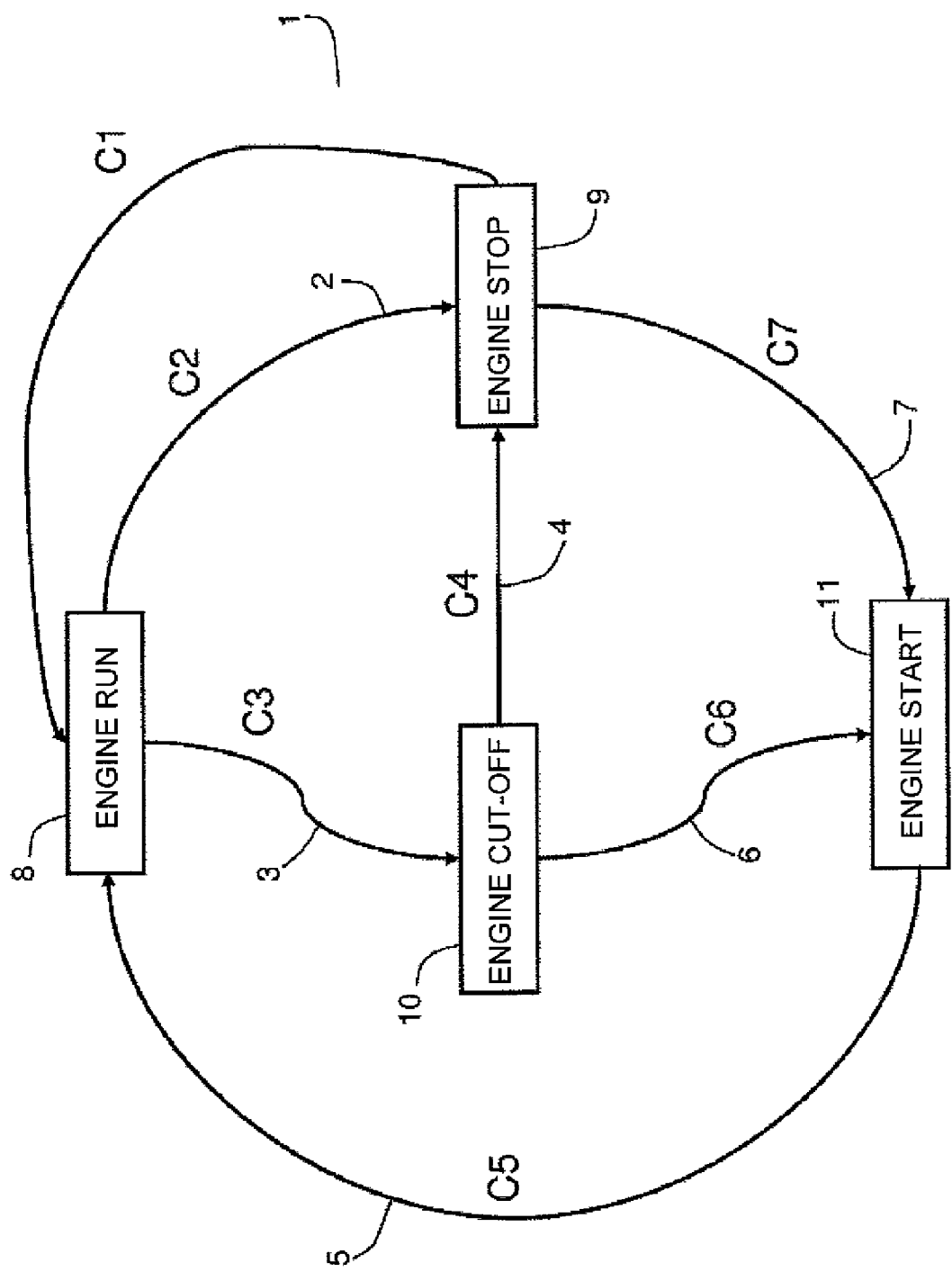

METHOD FOR CONTROLLING THE AUTOMATIC START/STOP SYSTEM OF THE THERMAL ENGINE OF A VEHICLE, CORRESPONDING SYSTEM AND USE THEREOF

CROSS-REFERENCE TO RELATED APPLICATIONS AND CLAIM TO PRIORITY

This application relates to International Application No. PCT/FR2008/050169 filed Feb. 1, 2008 and French Patent Application No. 0753111 filed Feb. 7, 2007, of which the disclosures are incorporated herein by reference and to which priority is claimed.

TECHNICAL FIELD OF THE INVENTION

The present invention relates to a method for controlling an automatic start/stop system of a thermal engine of a vehicle.
The invention also relates to this same system, and to the use thereof.

TECHNOLOGICAL BACKGROUND OF THE INVENTION

Energy saving and pollution reduction considerations, above all in the urban environment, are leading motor vehicle manufacturers to equip the models thereof with an automatic start/stop system, such as a "Stop and Go" system.

As the company VALEO EQUIPEMENTS ELECTRIQUES MOTEUR states in patent application FR2875549, the vehicles are made capable of operating according to the "Stop and Go" mode as a result of a reversible electric machine, or starter-alternator, coupled with the thermal engine.

The use of a starter-alternator in a "Stop and Go" operating mode consists, under certain conditions, in causing the thermal engine to stop completely when the vehicle itself has stopped, then restarting the thermal engine following, for example, an action by the driver interpreted as a restart request.

A typical "Stop and Go" situation is stopping at a red light. When the vehicle stops at the lights, the thermal engine is automatically stopped, then, when the light turns green, the engine is restarted by means of the starter-alternator, following the detection by the system of the driver pressing the clutch pedal, or of any other action conveying the wish of the driver to restart the vehicle.

To this end, as also indicated by the company VALEO EQUIPEMENTS ELECTRIQUES MOTEUR in patent application FR2875551, the "Stop and Go" system uses information representative of the operational state of the vehicle, which information is provided by the vehicle sensors, such as the sensors for the passenger compartment temperature or for detecting the position of the clutch pedal, or the information read on a data communication bus, such as the speed of the vehicle or the rotational speed of the engine.

Such an automatic start/stop system is, to date, only provided in private cars, yet the advantage thereof is well understood in terms of energy saving and environmental projection, taking into account town traffic conditions.

However, another source of pollution is the diesel engines of commercial vehicles, in particular those of buses and other service vehicles.

Some local authorities have therefore adapted their vehicle fleets to fuels other than gas oil, that are less polluting, such as LPG, ethanol or even hydrogen.

The fact remains that a bus carries out a number of stops and that the engine needlessly consumes fuel during the time that passengers get on and off.

It is therefore natural to envisage installing a "Stop and Go"-type system so as to reduce the average fuel consumption of a bus.

However, buses, as well as some heavy goods vehicles, have specific safety and driving assistance systems that private vehicles do not have.

In particular, the EAB, abbreviation for "Exploitation Assistance Brake" is a braking system, which allows the vehicle to be held back when the driver releases his/her foot from the service brake (footbrake) even when in gear.

When stopping at a red light, or during another prolonged stop, the driver generally applies a large pressure on the brake pedal so that the vehicle does not move forward. The EAB overcomes this requirement by applying the brakes, as explained in detail, for example, in document U.S. Pat. No. 3,905,651.

It also has another function, which is dedicated to public transport: it allows the back doors to be unlocked. Indeed, the bus driver cannot unlock the passenger doors without activating the EAB.

On all of these vehicles, the safety brake is activated as soon as the EAB is engaged.

On some vehicles, it is even possible to pre-activate the EAB before coming to a stop. This is extremely practical for preventing loss of time, but requires knowledge of other vehicle parameters in order to authorise the thermal engine to stop (for example: the vehicle speed, etc).

The EAB also enables the automatic gear box to be returned to neutral to prevent it becoming needlessly heated during stop stages.

The EAB also helps prevent lapses of concentration by the driver resulting in an accident. On some vehicles, when the EAB is engaged, even if the driver presses on the accelerator, nothing happens and no order is sent to the computer.

It further enables, on some buses, the vehicle to be slowed without the accelerator necessarily being released, or the air suspensions to be stiffened so as to make it safe for passengers to get on and off.

GENERAL DESCRIPTION OF THE INVENTION

The aim of the present invention is therefore to adapt a "Stop and Go" system known from the prior art to a vehicle provided with an EAB.

The precise subject matter thereof is a method for controlling an automatic start/stop system of a thermal engine of a vehicle of the type using information representative of an operational state of the vehicle, being provided by sensors and a data communication bus, this information being in particular representative of the activation or deactivation of an exploitation assistance brake, of a speed of the vehicle and of a pressure on or a release of a brake pedal of the vehicle.

This method is characterised in that a condition for activating the start of the thermal engine is validated in the case of releasing the brake pedal and deactivating the exploitation assistance brake, or in the case of deactivating the exploitation assistance brake.

Preferably, a cut-off condition for the thermal engine is then validated when the speed of the vehicle is lower than a predetermined threshold and in the case where pressure is applied on the brake pedal or when the exploitation assistance brake is activated.

The method according to the invention is also characterised in that the information it uses is further representative of a rotational speed of the vehicle engine, and of a cut-off of this engine.

A stop condition for the engine is then preferably validated during the cut-off of the engine and when the rotational speed is zero.

Alternatively, a vehicle start condition is advantageously validated when the rotational speed of the engine is equal to a pre-determined idling speed.

The invention also relates to an automatic start/stop system of a thermal engine of a vehicle, suitable for implementing the method disclosed above, which is characterised in that it includes at least one sensor for the state of the exploitation assistance brake.

According to the invention, the method and system described above are advantageously used onboard a commercial vehicle, preferably a passenger transport vehicle.

These few essential specifications would have made obvious to the person skilled in the art the advantages offered by the invention in relation to the prior art.

The detailed specifications of the invention are given in the following description with reference to the appended drawing. It should be noted that this drawing has no other purpose than to illustrate the text of the description and in no way represents a limitation of the scope of the invention.

BRIEF DESCRIPTION OF THE DRAWING

FIG. 1 is a modelling using a state graph for the method for controlling an automatic start/stop system of a thermal engine of a vehicle according to the invention.

DESCRIPTION OF THE PREFERRED EMBODIMENT OF THE INVENTION

A strategy implemented by an automatic start/stop system of a thermal engine of a vehicle according to the invention, shown in FIG. 1, has been simplified so as to retain only the transitions 1, 2, 3, 4, 5, 6, 7 between four states:
engine running 8;
engine stopped 9;
engine cut-off 10;
engine start 11.

The transitions 1, 2, 3, 4, 5, 6, 7 between these states 8, 9, 10, 11 occur if the conditions C1, C2, C3, C4, C5, C6, C7 specified in the following Table I are validated (the symbols & and II represent an AND-operator and an OR-operator respectively):

TABLE I

| | |
|---|---|
| C1 | (Ignition_key) & (Start_authorisation) |
| C2 | (Ignition_key = FALSE) |
| C3 | (Vehicle_speed < Stop_authorisation_threshold) & ((Pressure_on_brake_pedal) II (Activation_of_the_EAB)) |
| C4 | (Engine_cutt off) & (Engine_speed = 0) |
| C5 | (Engine_rotational_speed $\geq$ Idling_speed) |
| C6 | ((Release_of_the_brake_pedal) & (Deactivation_of_the_EAB)) II (Deactivation_of_the_EAB) |
| C7 | ((Release_of_the_brake_pedal) & (Deactivation_of_the_EAB)) II (Deactivation_of_the_EAB) |

The first transition 1 corresponds to the engine 8 being made to run by the driver, without use of the "Stop and Go" function. It occurs if a first condition C1 is validated, i.e. if the information representative of the state of the ignition key indicates that the active state is TRUE and that the state variable indicating that starting is possible is also TRUE.

The second transition 2 corresponds to the engine stopping 9 also as the result of the driver, without use of the automatic function. It occurs if a second condition C2 is validated, i.e. if at least the active state of the ignition key is FALSE.

The third transition 3 corresponds to the automatic cut-off 10 of the thermal engine by the "Stop and Go" system. It occurs if a third condition C3 specified in Table I above is validated, in particular if at least the EAB is activated.

The fourth transition 4 corresponds to the automatic stopping 9 of the thermal engine by the system following the engine cut-off 10. It occurs if a fourth condition C4 specified in Table I is validated.

The fifth transition 5 corresponds to the starting of the vehicle by the system after the engine start 11. It occurs if a fifth condition C5 specified in Table I is validated.

The sixth and seventh transitions 6, 7 correspond to the activation of the automatic start of the thermal engine by the system, either after the engine cut-off 10, or after the engine stop 9 respectively. They occur if sixth and seventh conditions C6, C7 specified in Table I are validated, in particular if at least the EAB is deactivated.

Of course, the invention is not only limited to the preferential embodiment described above.

Particularly, the state graph for the method according to the invention can include additional states, transitions or variables so as to adapt the modelling to the complexity of the automatic start/stop system, and to that of the EAB device.

On the contrary, the invention therefore includes all possible alternative embodiments which would remain within the scope defined by the following claims.

The invention claimed is:

1. Method for controlling an automatic start/stop system of a thermal engine of a vehicle comprising information representative of an operational state of said vehicle, being provided by sensors and a data communication bus, said information being representative of the activation or deactivation of an exploitation assistance brake (EAB), of a speed of said vehicle and of a pressure on or a release of a brake pedal of said vehicle, wherein a condition for activating the start (C6, C7) of said thermal engine is validated in the case of releasing said brake pedal and deactivating said exploitation assistance brake, or in the case of deactivating said exploitation assistance brake.

2. Method for controlling an automatic start/stop system of a thermal engine of a vehicle according to claim 1, wherein a cut-off condition (C3) for said thermal engine is validated when said speed is lower than a predetermined threshold, and in the case where pressure is applied on said brake pedal or when said exploitation assistance brake is activated.

3. Method for controlling an automatic start/stop system of a thermal engine of a vehicle according to claim 1, wherein said information is further representative of a rotational speed of said engine, and of a cut-off of said engine.

4. Method for controlling an automatic start/stop system of a thermal engine of a vehicle according to claim 3, wherein a stop condition (C4) for said engine is validated during said cut-off of said engine and when said rotational speed is zero.

5. Method for controlling an automatic start/stop system of a thermal engine of a vehicle according to claim 3, wherein a vehicle start condition (C5) is validated when said rotational speed is equal to a pre-determined idling speed.

6. Automatic start/stop system of a thermal engine of a vehicle according to claim 1, comprising at least one sensor for the state of said exploitation assistance brake.

7. Use of the method according to claim 1 in an automatic start/stop system of a thermal engine of a vehicle according to claim 1, comprising at least one sensor for the state of said exploitation assistance brake, onboard a passenger transport vehicle.

\* \* \* \* \*